Feb. 14, 1928.
F. MÜLLER
METHOD FOR INCREASING THE EFFICIENCY OF INJECTION AIR COMPRESSORS OF INTERNAL COMBUSTION ENGINES
Filed March 25, 1921
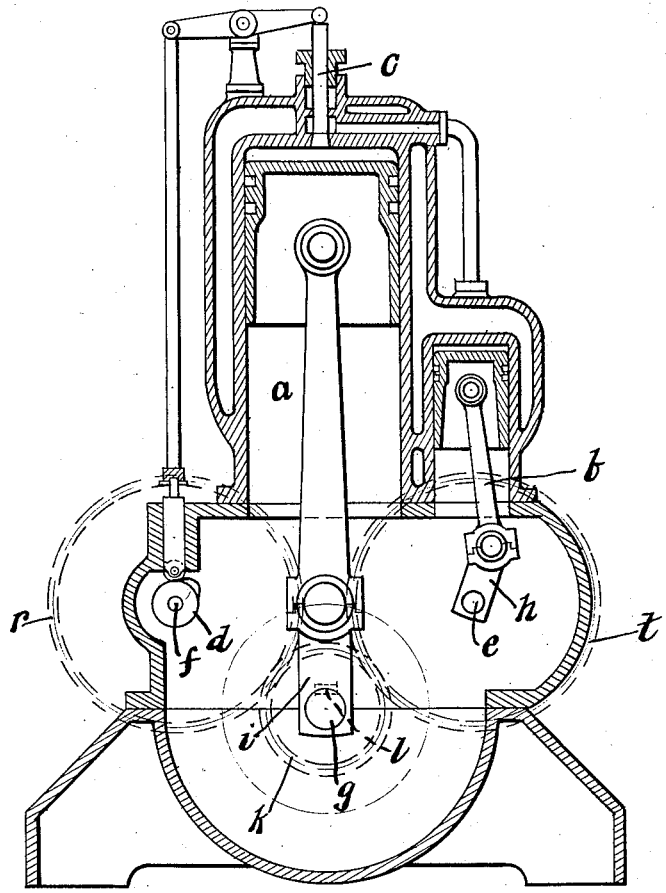
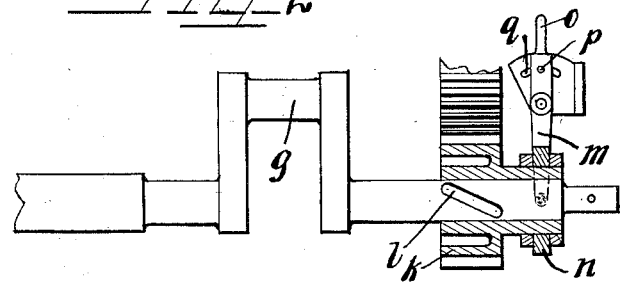

Patented Feb. 14, 1928.

1,659,043

UNITED STATES PATENT OFFICE.

FRIEDRICH MÜLLER, OF VIENNA, AUSTRIA.

METHOD FOR INCREASING THE EFFICIENCY OF INJECTION AIR COMPRESSORS OF INTERNAL-COMBUSTION ENGINES.

Application filed March 25, 1921, Serial No. 455,576, and in Austria November 6, 1917.

(GRANTED UNDER THE PROVISIONS OF THE ACT OF MARCH 3, 1921, 41 STAT. L., 1313.)

The present invention relates to internal combustion engines of the kind in which liquid fuel is injected into the working cylinder by means of compressed air supplied by a pump or compressor, the piston of which lags behind the working piston. According to the present invention, however, the delivery valve is actuated by mechanism which enables the timing of said valve to be adjusted, in such a way that the reversal of stroke of the compressor piston coincides in point of time with the closing of the injection or delivery valve, and that said injection valve closes at the end of the delivery stroke of the compressor. The relative displacement of the dead points of the piston affords accurate control over all the operations depending on the injection valve and enables the whole of the injection air compressed by the compressor—with the exception of the amount required by the small clearance space—to be transferred into the working cylinder.

The invention is particularly advantageous when applied to internal combustion engines in which the delivery stroke of the injection air compressor and the injection of fuel into the working cylinder are controlled by means of a single valve so that the injection valve of the working cylinder acts at the same time as the delivery valve of the air compressor.

The invention can also be applied to engines with injection valve gear, which is so controlled that the length of time the inlet valve remains open is varied in accordance with the load and speed. The variation which is designed to give a certain curve of combustion at each output and speed also causes an alteration in the time at which the injection valve is closed. The reversal of stroke of the compressor piston would (in case the lag of the compressor piston in relation to the working piston remained unaltered) no longer coincide with the closing of the valve.

It is therefore necessary to alter the drive of the compressor in accordance with the altered timing of the injection valve gear, so that reversal of stroke of the compressor piston coincides with the closing of the injection valve for the time being and any diminution of the quantity of injection air delivered is prevented.

The accompanying drawing shows one form of apparatus capable of carrying out the method, and the figure shown therein is a diagrammatic view.

In the drawing, $a$ is the working cylinder of an internal combustion engine with four-cycle output, $b$ is the compressor cylinder for generating the air to be injected, $c$ the injection valve and cam of the valve. Both the driving shaft $e$ of the compressor and the cam shaft $f$ make one-half the number of revolutions made by the main shaft $g$ of the engine.

According to the invention, the crank of the compressor $h$ follows the working crank $i$ at an angle corresponding to the period of injection, and the injection cam $d$ opens the injection valve at the beginning of the injection period and closes this valve when the compressor piston is at the upper dead point. By this arrangement the transfer of the injection air from the compressor to the working cylinder is accurately controlled.

When the engine is running with a variable number of revolutions, which is especially the case with the vehicle motors, the injection valve is opened earlier when the speed of revolution is high, and later when the speed of revolution is low, in order to obtain a correct curve of combustion at every speed. This alteration of the time of opening causes a corresponding change of the time of the closing of the valve. The closing of the valve no longer coincides with the reversal of the stroke at the dead point, of the compressor. It is therefore necessary, when changing the point of injection at the beginning of the injection period, to simultaneously change the crank angle of the compressor. For this purpose, the control wheel $k$ on the main shaft $g$ is placed so that it may be shifted axially. This wheel $k$, for instance, is fastened by means of a wedge $l$ placed in a slanting groove of the shaft, so that by the axial adjustment of the wheel $k$, which may be effected either by hand or by an automatic controller, (not shown in the drawing) the said wheel may be turned and thus the cam shaft $f$ and the compressor shaft $e$ will set the injection valve and the compressor piston in motion earlier when the speed of rotation is high, and later when the speed of rotation is low.

Thus, a high speed of rotation in the engine corresponds to an early opening and closing of the injection valve and accordingly an earlier reversal of the stroke of the compressor piston, and a low speed of rotation corresponds to a later opening of the injection valve and a later reversal of the piston stroke. The dead point of the piston stroke of the compressor, however, always coincides in point of time, at all the different rates of speed with the closing of the injection valve.

What I claim is:—

1. In internal combustion engines, the combination of an air compressor comprising a piston, an air control valve, a power shaft, a gear wheel on the same, separate gear wheels adapted to operate the valve and the compressor and driven by the power shaft gear wheel at a lower speed so as to reverse the piston and to close the valve simultaneously, and means for shifting the power shaft gear wheel to advance or retard the operation of said compressor piston and valve.

2. In an internal combustion engine, the combination of a power shaft driven by said engine, a gear wheel on the shaft, a compressor piston, a crank and rod operating the same, a gear wheel adapted to operate the crank and driven by the gear wheel of the shaft at a reduced speed, a valve adapted to control the admission of air to the engine, a cam operating the valve, a gear wheel for the cam and driven at reduced speed by the gear wheel on the power shaft, and a shifting key connecting the power shaft with its gear wheel and adapted to cause the compressor piston to reverse its stroke simultaneously with the closing of the valve and to change the relation of rotation of the shaft with its gear wheel.

FRIEDRICH MÜLLER.